United States Patent Office 3,260,637
Patented July 12, 1966

3,260,637
METHOD OF BONDING USING AMINE SOLUTIONS AS CATALYSTS WITH α-CYANOACRYLATE ADHESIVES
Paul T. von Bramer, Kingsport, Tenn., assignor to Eastman Kodak Company, Rochester, N.Y., a corporation of New Jersey
No Drawing. Filed Oct. 19, 1960, Ser. No. 63,459
8 Claims. (Cl. 156—314)

This invention relates to the use of promoters with α-cyanoacrylate adhesive compositions, and is particularly concerned with improved adhesive action of such compositions for bonding metallic and non-metallic surfaces.

This application is a continuation-in-part of my co-pending application Serial No. 662,345, filed May 29, 1957 (now abandoned).

Compositions comprising one or more monomeric esters of α-cyanoacrylic acid are known to have excellent utility in bonding together a variety of materials. Rapid setting to firm bonds is recognized as highly desirable. However, for commercial use, it has been found necessary to stabilize such compositions to prevent premature polymerization of the monomer, for example, by the incorporation therein of conventional phenolic inhibitors such as for example, hydroquinone, t-butyl catechol, etc. For more effective stabilization, substantial amounts of acidic inhibitors have been added, with or without phenolic inhibitors, such as sulfur dioxide, nitric oxide, hydrogen fluoride, organic acids, organic anhydrides, stannic chloride, ferric chloride, and other members of the class of so-called Lewis acids (I. M. Kolthoff, J. Phys. Chem., 48, pages 51–7, 1944). Compositions of the latter kind are referred to herein as "super" stabilized and are characterized by not setting up on standing on the shelf over relatively long periods of time. The principal disadvantage, however, is that the stabilized compositions described above tend to be less active, particularly where the materials to be bonded are of an acid nature such as green wood, phenolic resins, bonded plywood, etc. In some cases, no firm bonding has occurred even after applying excessive pressure along the glue line.

Various proposals have been made to overcome this problem. For example, in Coover U.S. Patent 2,768,109, there is described a means to improve the adhesive action of "super" stabilized α-cyanoacrylate adhesives by moistening the surfaces of the materials to be bonded with an aliphatic monohydric alcohol prior to application of the adhesive. Although certain improvements have been realized from this process, the use of alcohol promoters has not proven completely satisfactory, especially where the material to be bonded has been acid treated during the course of its preparation, for example, aluminum parts used in aircraft manufacture. Apparently, the acid condition encountered with acid treated surfaces and with "super" stabilized adhesive formulations cannot be effectively overcome with small amounts of alcohols as disclosed by the above Coover patent.

I have now discovered a greatly improved method which is rapid, reproducible and highly effective, whereby stabilized α-cyanoacrylate adhesive compositions can be effectively employed for the bonding together of metallic and non-metallic materials that heretofore have proven difficult to bond. My new process comprises first treating the surface to be bonded with a catalyst solution comprising an organic amine of a certain kind, followed by application of the adhesive thereover and the final pressing together of the surfaces. The time required for the entire opertion is relatively short and the resulting bond is very firm.

It is, accordingly, an object of the invention to provide a novel method of catalyzing the adhesive action of α-cyanoacrylate adhesive compositions so that firm bonding occurs in a minimum of time. Another object is to provide an improved method for firmly bonding surfaces which either possess an acidic character or which have been rendered acidic during their processing prior to bonding. Another object is to provide a novel method for using "super" stabilized α-cyanoacrylate adhesive compositions for bonding of various materials. Other objects will become apparent from the description, examples and claims which follow:

In accordance with the invention, I employ a catalyst solution comprising one or more organic amines such as secondary amines, tertiary amines, N-substituted alkanolamines, acylated N-substituted alkanolamines, diamines and certain heterocyclic amines in a suitable solvent to moisten the surfaces to be bonded and to catalyze the adhesive action of the α-cyanoacrylate adhesive. The catalyst solution may be applied by any convenient method, for example, it may be sprayed or dipped onto one of the surfaces to be bonded, and after a few seconds to allow the solvent to evaporate, the proper amount of adhesive is applied either to the amine treated surface or to the untreated surface and the two surfaces are then pressed together. A rapid and strong bond results within seconds depending to some extent on the concentration of catalyst employed and also on the amount of acidic type material present in the adhesive itself. Thus, by choosing the proper catalyst concentration, the time for bond formation can be regulated as desired. Two advantages result from the wide latitude of bond formation times thus provided. Bonds can be prepared which are either slow setting or rapid setting as may be required based on the time necessary or available to adjust the parts to permit perfect juxtaposition. In addition, adhesive formulations may be prepared which are extremely stable at room temperature or above, but which polymerize rapidly to give strong bonds when exposed to surfaces coated with the catalyst systems described herein. It will be understood that the catalyst solution may be applied, if desired, to both of the surfaces to be bonded. Also while some variation in temperature may be safely tolerated, the best results are obtainable at about room temperature. In the step of pressing the treated surfaces together with the interlayer of adhesive, heat may be applied if desired.

The secondary amines which can advantageously be used in the invention are selected from those defined by the following general formula:

wherein each R represents an alkyl radical of from 1–8 carbon atoms, e.g. methyl, ethyl, propyl, isopropyl, butyl, 2-ethylhexyl, etc., an aryl radical containing from 6–8 carbon atoms, e.g. phenyl, tolyl, xylyl, etc. groups, an aralkyl radical containing from 7–8 carbon atoms, e.g. benzyl or phenylethyl or a cycloalkyl radical containing from 5–6 carbon atoms, e.g. cyclopentyl or cyclohexyl. Typical amines coming within the above formula include dimethylamine, diethylamine, dipropylamine, diisopropylamine, dibutylamine, methylethylamine, propylbutylamine, diphenylamine, methylaniline, butylaniline, dibenzylamine, ethylbenzylamine, butylbenzylamine, dicyclohexylamine, etc.

As tertiary amines, I can advantageously use those defined by the following general formula:

wherein each R is as above defined. Typical tertiary amines include trimethylamine, triethylamine, tripropylamine, triisopropylamine, tributylamine, methyldiethylamine, methyldipropylamine, dimethylethylamine, methylethylpropylamine, methylethylaniline, methylisopropylaniline dipropylaniline, methyldiphenylamine, ethyldiphenylamine, triphenylamine, diethylbenzylamine, dipropylbenzylamine, etc.

As N-substituted alkanolamines, I can advantageously use those defined by the following general formula:

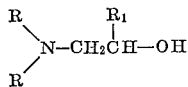

wherein each R is as above defined and $R_1$ represents a hydrogen atom, an alkyl radical containing from 1–4 carbon atoms, an aryl radical containing from 6–8 carbon atoms, an aralkyl radical containing from 7–8 carbon atoms or a cycloalkyl radical containing from 5–6 carbon atoms. Typical N-substituted alkanolamines include dimethylethanolamine, diethylethanolamine, dibutylethanolamine, methylethylethanolamine, diphenylethanolamine, phenylethylethanolamine and the corresponding ethanolamines wherein $R_1$ is alkyl, aryl, aralkyl or cycloalkyl as defined above, e.g. N-benzyl-N-ethyl-N-(2-phenylethanol)amine.

As acylated N-substituted alkanolamines, I can advantageously use those defined by the following general formula:

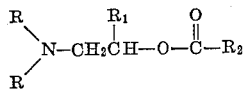

wherein each R and $R_1$ are as above defined and $R_2$ represents an alkyl or alkenyl radical containing from 1–8 carbon atoms, e.g. methyl, ethyl, propyl, isopropyl, butyl, pentyl, 2-ethylhexyl, vinyl, propenyl, isopropenyl, butenyl, etc. Typical acylated N-substituted alkanolamines include the acetic, propionic, butyric, valeric, acrylic, methacrylic, benzoic, etc. acid esters of dialkylethanolamine e.g. β-dimethylaminoethyl acetate, β-diethylaminoethyl acetate, β-dimethylaminoethyl methacrylate, β-diethylaminoethyl acrylate, β-dimethylaminoethyl benzoate, β-diethylaminoethyl benzoate, β-dimethylaminoisopropyl benzoate, etc.

As diamines, I can advantageously use those defined by the following general formula:

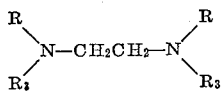

wherein R is as above defined and $R_3$ represents a hydrogen atom or an alkyl radical containing from 1–4 carbon atoms. Typical diamines include N,N'-dimethyl-ethylenediamine, N,N'-diethyl-ethylenediamine, N,N'-dibutyl-ethylenediamine, N,N'-dicyclohexyl-ethylenediamine, N, N, N' N'-tetraethyl-ethylenediamine, N,N-dimethyl-N', N'-diethyl-ethylene diamine, N'-benzyl-N,N-diethyl-ethylenediamine, N,N'-diphenyl-ethylenediamine, N,N-diethyl-N',N'-diphenyl-ethylenediamine, etc.

As heterocyclic amines, I can advantageously use tertiary diamines such as triethylene diamine, tertiary piperazines defined by the following general formula:

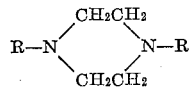

wherein R is as above defined, e.g. 1-methyl-4-(2-hydroxypropyl)piperazine, 1,4-bis(2-hydroxyethyl)piperazine, etc., or compounds defined by the following general formula:

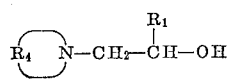

wherein $R_1$ is as above defined and $R_4$ represents the atoms necessary to complete a 5- or 6-membered heterocyclic nucleus e.g. N-(2-hydroxyethyl)morpholine, N-(2-hydroxypropyl)morpholine, N-(2-hydroxyethyl)piperidine, 2-(2-hydroxypropyl)piperidine, 2-(2-hydroxyethyl)pyrrolidine, etc. Other useful amines are poly-N-vinyl pyridine and poly(ethyleneimine).

While practically any volatile solvent in which the amine is soluble may be used, the preferred solvents for preparing solutions of the above amines are saturated esters of alkanols of 1–3 carbon atoms and saturated monobasic fatty acids of 1–3 carbon atoms, e.g. methyl acetate, ethyl acetate, methyl propionate, etc. and ketones, but more especially acetone because of its good solvent power and high volatility. Other suitable solvents include methylene chloride, chloroform, methyl chloroform, methyl ethyl ketone, hexane, benzene, methanol and ethanol. In general, the solvent used should preferably have a boiling point of less than 100° C. and should not react with the amine under the conditions of use. The effective concentration of the amine may vary from 1–30%, based on the total weight of the catalyst solution. Concentrations higher than 30% tend to cause too rapid bond formation, while concentrations below 1% are generally ineffective in promoting firm bond formation. Also equal concentrations of different amine catalysts will not necessarily give equally efficacious results. For example, when bonding aluminum to aluminum with methyl α-cyanoacrylate adhesive, a 15% acetone solution of phenyl ethyl ethanolamine will cause bond formation to occur in 25–30 seconds, whereas a 15% acetone solution of tri(2-ethylhexyl)amine, under the same conditions, will cause bond formation to occur in the longer period of 40–50 seconds. In contrast to the highly satisfactory bonding results obtainable with the above defined catalyst solutions, we have found that organic bases such as primary organic amines, pyridine, quinoline, and piperidine and inorganic bases such as ammonia, sodium carbonate, sodium hydroxide, etc. are unsuitable even in very dilute solutions, because they cause too rapid polymerization of the adhesive and thus very weak bond formation results.

Suitable adhesive compositions for practicing my invention comprise one or more α-cyanoacrylate monomers represented by the general formula:

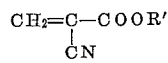

wherein R' represents an alkyl radical of 1 to 16 carbon atoms, for example, methyl, ethyl, butyl, hexyl, dodecyl, etc. radicals, a cyclohexyl radical or a phenyl radical. The lower alkyl α-cyanoacrylate esters are preferred because their bonding is more rapid than is that of the higher esters such as capryl α-cyanoacrylate. Advantageously, the above defined monomers may be thickened by incorporation therein of polymeric materials such as a polyacrylate, a polymethacrylate, a cellulose ester, etc. in an amount up to 25% by weight based on the total composition weight. A plasticizer may also be advantageously added to the composition such as alkyl esters of aliphatic monocarboxylic acids, e.g. methyl cyanoacetate, ethyl cyanoacetate, etc., phthalates such as dioctyl phthalate, phosphates such as tricresyl phosphate, acyl triesters of glycerin such as glyceryl triacetate, glyceryl tributyrate, etc., esters of aliphatic dibasic acids such as dimethyl succinate, diethyl adipate, dimethyl sebacate, diethyl sebacate, etc. and similar plasticizing materials in an amount of from 1 to 20% based on the total weight of the monomer. Advantageously, the adhesive compositions are protected against premature polymerization of the monomer by addition thereto of a polymerization inhibitor such as hydroquinone, t-butyl catechol, etc. However, usually the monomer contains varying amounts (from about 0.001 to 0.10% by weight) of residual gaseous inhibitors such as sulfur dioxide, nitric oxide, and hydrogen fluoride which were originally introduced to prevent polymerization of the monomer during its manufacture and also to guarantee an adequate shelf life for the final adhesive formulation. The neutralization of these gaseous inhibitors and other acidic materials in the final adhesive formulation is effectively accomplished by the amines of this inventon whereas the use of alcohol promoters does ont affect this neutralization to a useful extent. A typical adhesive composition for use in the inventon has the following weight composition:

| | Percent |
|---|---|
| Methyl α-cyanoacrylate containing 0.01% hydroquinone plus an undetermined amount of sulfur dioxide (0.001 to 0.10%) | 90.7 |
| Polymethyl methacrylate | 6.0 |
| Dimethyl sebacate | 3.3 |

The following examples will illustrate further the manner of practicing my invention.

*Example 1*

This example illustrates the effectiveness of a solution of phenylethylethanolamine in promoting the bonding of wood surfaces with a "super" stabilized adhesive formulation compared with the use of an alcohol promoter and the use of no promoter.

(a) Two pieces of unseasoned oak wood were bonded together with a methyl α-cyanoacrylate adhesive containing 0.015% sulfur dioxide as a stabilizer. In this case, no bond was formed within 30 minutes.

(b) Experiment (a) was repeated with the exception that one of the wood surfaces was moistened with methyl alcohol and the adhesive containing 0.015% sulfur dioxide was placed on the other surface. The pieces were joined and no bond had formed within three minutes.

(c) Experiment (a) was repeated with the exception that one of the wood bonding surfaces was moistened with a 30% acetone solution of phenylethylethanolamine and the adhesive containing 0.015% sulfur dioxide was placed on the other surface. The pieces were joined and a firm bond resulted within one minute.

The above results clearly indicate the superiority of the amines of this invention in promoting the adhesive bonding of "super" stabilized adhesives on unseasoned, acid containing wood.

*Example 2*

This example illustrates the effectiveness of a solution of phenylethylethanolamine in promoting the bonding of aluminum surfaces compared with a nonpromoted bonding using a slow-acting adhesive formulation. The ineffectiveness of methyl alcohol as a promoter in this application is also illustrated.

(a) Two thoroughly cleaned 1″ x 3″ x ¼″ aluminum test pieces were bonded as follows. First, one of the aluminum surfaces was wiped with a piece of cleansing tissue moistened with a small amount of catalyst solution comprising a 30% acetone solution of phenylethylethanolamine. Then, methyl α-cyanoacrylate adhesive containing 0.015% sulfur dioxide stabilizer, was applied to the surface of the other block. After the acetone had evaporated from the amine treated surface, the two surfaces were pressed together. A strong bond had formed in 5-10 seconds after pressing the surfaces together.

(b) The procedure of 2(a) above was repeated except that one of the surfaces was moistened with a small amount of methyl alcohol. Methyl α-cyanoacrylate adhesive containing 0.015% sulfur dioxide was applied to the other surface. A bond had not formed within four minutes.

(c) In contrast to the above, similar blocks of aluminum were pressed together under the same conditions, except the step of applying the catalyst solution of phenylethylethanolamine was omitted. In this case, the adhesive remained fluid even after 10 minutes.

*Example 3*

This example illustrates the effectiveness of a solution of phenylethylethanolamine in promoting the bonding of glass surfaces with a "super" stabilized adhesive formulation compared with the use of methyl alcohol as a promoter and with no promoter.

(a) Two pieces of 1″ x 3″ plate glass were cleaned with acetone. One of the surfaces was moistened with a 30% methylene chloride solution of phenylethylethanolamine, a drop of methyl α-cyanoacrylate adhesive containing 0.015% sulfur dioxide as a stabilizer was placed on the other piece of glass and two treated surfaces were pressed together. An unbreakable bond was formed within 5-10 seconds.

(b) The above procedure was repeated with the exception that one of the surfaces was moistened with methyl alcohol instead of an amine solution. When the treated surfaces were pressed together a bond did not form within one minute.

(c) Repetition of the above experiment using the adhesive alone gave no bond within five minutes.

*Example 4*

The procedure of Example 2(a) was repeated except the catalyst solution used was a 1% acetone solution of phenylethylethanolamine. A strong aluminum to aluminum bond was formed in 1.5 minutes.

*Example 5*

The procedure of Example 2(a) was repeated except the catalyst solution was a 15% acetone solution of tri (2-ethylhexyl)amine. A strong aluminum to aluminum bond was formed in 40-50 seconds.

*Example 6*

The procedure of Example 2(a) was repeated except the catalyst solution was a 1% acetone solution of tri (n-propyl)amine. A strong aluminum to aluminum bond was formed in one minute.

*Example 7*

The procedure of Example 2(a) was repeated except the catalyst solution was a 5% acetone solution of N-(2-hydroxypropyl)morpholine. A strong aluminum to aluminum bond was formed within 45 seconds.

*Example 8*

The procedure of Example 2(a) was repeated except the catalyst solution was a 5% acetone solution of 1-methyl-4-(2 - hydroxypropyl)piperazine. A strong aluminum to aluminum bond was formed within 40 seconds.

*Example 9*

The procedure of Example 2(a) was repeated except the catalyst solution was a 15% acetone solution of N-benzyl-N-ethyl-N-(2 - phenylethanol)amine. A strong aluminum to aluminum bond was formed within 1.5 minutes.

*Example 10*

The procedure of Example 2(a) was repeated except the catalyst solution was a 1% acetone solution of triethylenediamine. A strong aluminum to aluminum bond was formed within one minute.

*Example 11*

(a) The procedure of Example 2(a) was repeated except that two smooth kiln-dried pieces of maple wood were used with a 5% acetone solution of poly N-vinylpyridine as the catalyst solution. A strong wood to wood bond resulted within 2 minutes.

(b) Two pieces of smooth kiln-dried maple wood were pressed together using the same adhesive formulation as in 11(a) above but no catalyst solution. After several attempts, it was found that a strong bond occurred only after a 5-minute interval had elapsed.

Example 12

The procedure of Example 11(a) was repeated except that the adhesive used contained 0.1% acetic acid as stabilizer and a 15% acetone solution of 1,4-bis(2-hydroxyethyl)piperazine was the catalyst with kiln-dried maple wood. A strong bond formed within 2 minutes.

Example 13

The procedure of Example 2(a) was repeated except that the adhesive used contained 0.05% phosphoric acid as stabilizer and the catalyst solution was a 1% acetone solution of poly(ethyleneimine). A strong aluminum to aluminum bond resulted within one minute.

Example 14

This example illustrates the bonding a phenolic resin with a methyl α-cyanoacrylate adhesive. First, one of the phenolic surfaces was wiped with a piece of cleansing tissue moistened with a catalyst solution comprising a 25% catalyst solution of phenylethylethanolamine in chloroform. Then, methyl α-cyanoacrylate adhesive containing 0.03% of sulfur dioxide was applied to the surface of the other phenolic block. After the chloroform had evaporated from the amine treated surface, the two surfaces were pressed together. A strong bond had formed within 30 seconds after pressing the surfaces together.

Example 15

This example illustrates the accelerated bonding action of a suitable amine on an adhesive prepared from (2-ethylhexyl) 2-cyanoacrylate.

(a) Two pieces of thoroughly cleaned aluminum 1" x 3" x ¼" were used. One of the surfaces was wiped with a cloth moistened with a 25% acetone solution of phenylethylethanolamine. On the other surface was placed one drop of (2-ethylhexyl) 2-cyanoacrylate adhesive containing 0.01% of sulfur dioxide. After the acetone had evaporated from the amine treated surface, the two surfaces were pressed together. A strong bond had formed within one minute after pressing the surfaces together.

(b) In contrast to the above, on one piece of aluminum was placed a drop of the (2-ethylhexyl) 2-cyanoacrylate adhesive referred to above. The two aluminum surfaces were pressed together. A bond had not formed within a three-minute period.

Example 16

This experiment illustrates the rapid development of tensile strength in steel bonds promoted with a 0.5% acetone solution of phenylethylethanolamine. Each of five steel tensile test specimens was wiped with a cloth moistened with a 0.5% acetone solution of phenylethylethanolamine. On each of five identical test specimens was placed one drop of a methyl 2-cyanoacrylate adhesive containing 0.02% of sulfur dioxide. After the acetone had evaporated, the bonds were formed by bringing the test block wiped with the catalyst solution into contact with the test block coated with the adhesive. The blocks were allowed to cure five minutes at room temperature and were then broken in tension on a Baldwin-Southwark testing machine. The average tensile strength was 1770 p.s.i. Bonds prepared using the same catalyst and adhesive but allowed to cure 30 minutes before testing had a bond strength of 5100 p.s.i. Control bonds prepared without catalyst but with the same adhesive had a bond strength of 325 p.s.i. after a 30 minute cure at room temperature. This example illustrates that catalyst concentrations of as low as 0.5% are effective in some cases in the promotion of strong bonds.

It will be seen from the preceding description and examples that the method of the invention employing a prior treatment with a catalyst solution comprising one or more of the aforementioned amines gives greatly improved bonding with α-cyanoacrylate adhesive compositions. Not only is the time shortened for the production of strong bonds, but the results obtained are reproducible. An added feature gained from the use of catalysts for accelerating the bonding of cyanoacrylate type adhesives is that "super" stabilized formulations may be marketed. As explained earlier, the incorporation of excessive amounts of acidic inhibitors in cyanoacrylate adhesive formulations renders the adhesive less active. However, the stability of the adhesive toward setting up or standing on the shelf is also greatly increased by using excessive amounts of these acidic inhibitors. Therefore, the catalysts of this invention are particularly valuable in that they permit the use of these "super" stabilized formulations at infrequent intervals during which the adhesive remains perfectly stable. It will be understood that any other of the mentioned acidic inhibitors such as hydrogen fluoride, nitric oxide, stannic chloride, the so-called Lewis acids, etc. in the range of 0.001 to 0.10% by weight of the adhesive composition can also be effectively employed in place of the sulfur dioxide in the above examples.

The factors referred to above are of prime importance in commercial applications and, as previously mentioned, of outstanding utility where metal parts such as those fabricated of aluminum are to be assembled. While the examples are limited to just a few of the catalyst solutions, it will be understood that any of the other mentioned suitable amines will function in a generally similar fashion to give firmly bonded materials. The method of the invention can also be employed with advantage in the bonding of other materials such as glass, rubber, plastics, textiles, paper, and the like. Dissimilar materials such as different metal surfaces, etc. can also be bonded by the method of the invention.

What I claim is:

1. In the method of bonding the surfaces of articles together by the use of an α-cyanoacrylate adhesive composition, the improvement which comprises moistening at least one of the surfaces to be bonded with an amine solution consisting of from 1–30 parts by weight of a compound selected from the group consisting of poly N-vinylpyridine, poly(ethyleneimine) and an amine defined by the following general formulas:

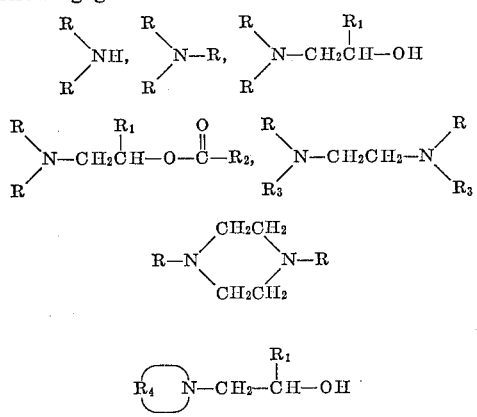

and wherein each R represents a member selected from the group consisting of an alkyl radical containing from 1–8 carbon atoms, a phenyl radical, a tolyl radical and a xylyl radical, a benzyl radical, a phenylethyl radical, a cyclopentyl radical and a cyclohexyl radical, each $R_1$ represents a member selected from the group consisting of a hydrogen atom, an alkyl radical containing from 1–4 carbon atoms, a phenyl radical, a tolyl radical, a xylyl radical, a benzyl radical, a phenylethyl radical, a cyclopentyl radical and a cyclohexyl radical, $R_2$ represents a member selected from the group consisting of an alkyl radical containing from 1–8 carbon atoms and an alkenyl radical containing from 1–8 carbon atoms, each $R_3$ represents a member selected from the group consisting of a hydrogen atom and an alkyl radical containing from 1–8 carbon atoms and $R_4$ represents the radical $$-CH_2CH_2-O-CH_2CH_2-$$

and from 99–70 parts by weight of a solvent having a boiling point below 100° C. selected from the group consisting of a saturated monohydroxy aliphatic alcohol containing from 1–3 carbon atoms, an ester of said alcohol with a saturated monobasic fatty acid containing from 1–3 carbon atoms, acetone, methyl ethyl ketone, methylene chloride, chloroform, methyl chloroform, hexane and benzene, and thereafter applying to the surface of at least one of the surfaces to be bonded a film of adhesive composition comprising α-cyanoacrylate monomer of the general formula:

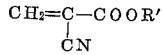

wherein R' represents a member selected from the group consisting of an alkyl radical containing from 1–16 carbon atoms, a cyclohexyl radical and a phenyl radical.

2. The method of claim 1 in which the surfaces are wood.

3. The method of claim 1 in which the surfaces are aluminum.

4. The method of claim 1 in which the surfaces are glass.

5. The method of claim 1 in which the surfaces are steel.

6. The method of claim 1 in which the solvent is acetone, the α-cyanoacrylate monomer is methyl α-cyanoacrylate and said adhesive composition contains an acidic polymerization inhibitor.

7. The method according to claim 1 in which the surfaces are wood, aluminum, glass or steel and the amine solution comprises from 1–30 parts by weight of poly-N-vinylpyridine, poly(ethyleneimine), phenylethylethanolamine, 1,4-bis(2-hydroxyethyl) piperazine, tri(2-ethylhexyl)amine, tri(n-propyl)amine, N-(2-hydroxypropyl) morpholine, 1-methyl-4-(2-hydroxypropyl)piperazine, N-benzyl-N-ethyl-N-(2-phenylethanol)amine or triethylenediamine, and from 99–70 parts by weight of said solvent.

8. The method according to claim 7 in which said solvent is acetone, said α-cyanoacrylate monomer is methyl α-cyanoacrylate and said adhesive composition contains from 0.001 to 0.10 percent by weight of sulfur dioxide.

References Cited by the Examiner
UNITED STATES PATENTS

| | | |
|---|---|---|
| 2,182,306 | 12/1939 | Ulrich et al. |
| 2,626,931 | 1/1953 | Bestian. |
| 2,768,109 | 10/1956 | Coover. |
| 2,776,232 | 1/1957 | Shearer et al. |
| 2,784,127 | 3/1957 | Joyner et al. |
| 2,794,788 | 6/1957 | Coover et al. |

ALEXANDER WYMAN, Primary Examiner.

CARL F. KRAFFT, EARL M. BERGERT, Examiners.

C. STEIN, R. J. ROCHE, Assistant Examiners.